US009515959B2

(12) United States Patent
Rounak

(10) Patent No.: US 9,515,959 B2
(45) Date of Patent: *Dec. 6, 2016

(54) SYSTEMS AND METHODS FOR REDUCED BANDWIDTH DATA TRANSMISSION BETWEEN NETWORK CONNECTED DEVICES

(71) Applicant: AOL Inc., Dulles, VA (US)

(72) Inventor: El Amine M. Rounak, Bethesda, MD (US)

(73) Assignee: AOL Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,578

(22) Filed: Nov. 30, 2015

(65) Prior Publication Data

US 2016/0156571 A1 Jun. 2, 2016

Related U.S. Application Data

(63) Continuation of application No. 13/929,511, filed on Jun. 27, 2013, now Pat. No. 9,232,022.

(51) Int. Cl.
*G06F 12/00* (2006.01)
*H04L 12/911* (2013.01)
(Continued)

(52) U.S. Cl.
CPC ............... *H04L 47/82* (2013.01); *H04L 47/12* (2013.01); *H04L 67/02* (2013.01); *H04L 67/142* (2013.01);
(Continued)

(58) Field of Classification Search
USPC ......................................................... 711/141
See application file for complete search history.

(56) References Cited

U.S. PATENT DOCUMENTS 6,141,773 A * 10/2000 St. Pierre ............ G06F 11/1451
711/162
2009/0327305 A1 12/2009 Roberts et al.
2013/0198338 A1* 8/2013 Pinto ................... H04L 67/2842
709/219

FOREIGN PATENT DOCUMENTS

WO WO 2007/065850 A2 6/2007

OTHER PUBLICATIONS

Mogul, J. et al: "Delta encoding in HTTP", Network Working Group Request for Comments, XX, XX, No. 3229, Jan. 1, 2002, XP002211285, the whole document (pp. 1-49).

(Continued)

*Primary Examiner* — Jared Rutz
*Assistant Examiner* — Hamdy S Ahmed
(74) *Attorney, Agent, or Firm* — Bookoff McAndrews PLLC

(57) ABSTRACT

Systems and methods are disclosed for reducing bandwidth during the transmission of data between first and second devices over a network. One method includes: receiving a first data request from the first device; generating a first request identifier associated with the first data request; transmitting to the first device a response to the first data request and the first request identifier associated with the first data request; receiving, from the first device, a partial second data request, the partial second data request including the first request identifier associated with the first data request, and a differential between the first data request and the second data request; and constructing, at the second device, a full second data request, based on a comparison between the first data request, fetched using the first request identifier, and the received differential between the first data request and the second data request.

16 Claims, 6 Drawing Sheets

(51) Int. Cl.
  *H04L 29/08*   (2006.01)
  *H04L 12/801*  (2013.01)
  *H04L 29/06*   (2006.01)

(52) U.S. Cl.
  CPC ............... *H04L 67/32* (2013.01); *H04L 69/04* (2013.01); *H04L 67/42* (2013.01)

(56) References Cited

OTHER PUBLICATIONS

International Search Report and Written Opinion dated Sep. 5, 2014, International Application No. PCT/US2014/043876 (11 pages).

* cited by examiner

SYSTEMS AND METHODS FOR REDUCED BANDWIDTH DATA TRANSMISSION BETWEEN NETWORK CONNECTED DEVICES

CROSS-REFERENCE TO RELATED APPLICATION(S)

This application is a continuation of U.S. Nonprovisional patent application Ser. No. 13/929,511, filed Jun. 27, 2013, the entirety of which is incorporated herein by reference.

TECHNICAL FIELD

Various embodiments of the present disclosure relate generally to data transmission between network connected devices. More specifically, exemplary embodiments of the present disclosure relate to systems and methods for reducing bandwidth during the transmission of data, such as according to HTTP, between devices over the Internet.

BACKGROUND

People are increasingly accessing Internet content, applications, and web-services over their mobile devices. Many experts have expressed their belief that mobile web traffic has now surpassed traditional, desktop-based traffic. The use of mobile applications now represents a staggering proportion of consumers' free time, and of online companies' revenue. Web developers, publishers, and e-commerce sites have gone to great lengths to accommodate the tremendous increase in mobile web browsing. For example, developers and sites have propagated mobile-specific versions of their sites, and mobile applications that simplify a user's interaction with content and services, in the context of the smaller displays and input mechanisms associated with mobile devices.

In the context of traditional HTTP communications over a network, especially in a bandwidth controlled network, the need to generate and transmit multiple, similar, fully-constructed requests may cause inefficiencies. For example, if a server, computer, or mobile device is interacting with another server, computer, or mobile device over a network, that device might make two or more requests to the opposing device. For example, a mobile phone might send a first request for content to a server and a second request for content to the server. Even though both requests are of the same structure, the mobile device must traditionally generate and transmit both entire requests, even though only a small input or parameter may be different between the first and second requests. In a bandwidth controlled network, and/or in a relatively lower bandwidth mobile network, the generation and transmission of multiple similar HTTP requests may cause many disadvantages, including slow response time, user dissatisfaction, and lower revenue associated with such activities.

Accordingly, a need exists for systems and methods for improved data transmission between network connected devices. More specifically, a need exists for systems and methods for reducing bandwidth during the transmission of data, such as according to HTTP, between devices over the Internet.

SUMMARY OF THE DISCLOSURE

According to certain embodiments, methods are disclosed for reducing bandwidth during the transmission of data between first and second devices over a network. One method includes receiving, from the first device over the network, a first data request; generating, and storing at the second device, a first request identifier associated with the first data request; transmitting, to the first device over the network, a response to the first data request and the first request identifier associated with the first data request; receiving, from the first device over the network, a partial second data request, the partial second data request including (i) the first request identifier associated with the first data request, and (ii) a differential between the first data request and the second data request; and constructing, at the second device, a full second data request, based on a comparison between the first data request, fetched using the first request identifier, and the received differential between the first data request and the second data request.

Embodiments of the disclosure relate to one or more of: generating, at the second device, a response to the full second data request; and transmitting, to the first device over the network, a differential between the response to the first data request and the response to the full second data request; and to generating, at the second device, a response to the full second data request; and transmitting, to the first device over the network, an identifier associated with the full second data request, and a differential between the response to the first data request and the response to the full second data request.

In certain embodiments, the first device constructs a full second response, based on a comparison between the first data response, fetched using the first request identifier, and the received differential between the first data response and the full second data response; or the first device constructs a full second response, based on a comparison between the first data response, fetched using the first request identifier, and the received differential between the first data response and the full second data response.

In certain embodiments, the response to the first data request and the first request identifier associated with the first data request are stored at the first device; the first request identifier associated with the first data request is stored within a cache of the second device; constructing, at the second device, the full second data request, is performed by merging the received differential between the first data request and the second data request into the first data request; constructing, at the second device, the full second data request, is performed by swapping a payload element in the first data request with a payload element in the received differential between the first data request and the second data request; the first device is a personal computer, tablet computer, or smartphone and the second device is a server executing a Web-based Simple Object Access Protocol ("SOAP") service, Extensible Markup Language ("XML") service, or Representational State Transfer ("REST") service.

According to certain embodiments, systems are disclosed for reducing bandwidth during the transmission of data between first and second devices over a network. One system includes a data storage device storing instructions for reducing bandwidth during the transmission of data between first and second devices over a network; and a processor configured to execute the instructions to perform a method including: receiving, from the first device over the network, a first data request; generating, and storing at the second device, a first request identifier associated with the first data request; transmitting, to the first device over the network, a response to the first data request and the first request identifier associated with the first data request; receiving, from the first device over the network, a partial second data request, the partial second data request including (i) the first request identifier associated with the first data request, and (ii) a differential between the first data request and the second data request; and constructing, at the second device, a full second data request, based on a comparison between the first data request, fetched using the first request identifier, and the received differential between the first data request and the second data request.

According to certain embodiments, the processor is further configured for: generating, at the second device, a response to the full second data request; and transmitting, to the first device over the network, a differential between the response to the first data request and the response to the full second data request; or generating, at the second device, a response to the full second data request; and transmitting, to the first device over the network, an identifier associated with the full second data request, and a differential between the response to the first data request and the response to the full second data request.

According to certain embodiments, the first device constructs a full second response, based on a comparison between the first data response, fetched using the first request identifier, and the received differential between the first data response and the full second data response; or the first device constructs a full second response, based on a comparison between the first data response, fetched using the first request identifier, and the received differential between the first data response and the full second data response.

According to certain embodiments, the response to the first data request and the first request identifier associated with the first data request are stored at the first device; the first request identifier associated with the first data request is stored within a cache of the second device; constructing, at the second device, the full second data request, is performed by merging the received differential between the first data request and the second data request into the first data request; or constructing, at the second device, the full second data request, is performed by swapping a payload element in the first data request with a payload element in the received differential between the first data request and the second data request.

According to certain embodiments, a computer readable medium is disclose that stores instructions that, when executed by a computer, cause the computer to perform a method of reducing bandwidth during the transmission of data between first and second devices over a network, the method including: receiving, from the first device over the network, a first data request; generating, and storing at the second device, a first request identifier associated with the first data request; transmitting, to the first device over the network, a response to the first data request and the first request identifier associated with the first data request; receiving, from the first device over the network, a partial second data request, the partial second data request including (i) the first request identifier associated with the first data request, and (ii) a differential between the first data request and the second data request; and constructing, at the second device, a full second data request, based on a comparison between the first data request, fetched using the first request identifier, and the received differential between the first data request and the second data request.

Additional objects and advantages of the disclosed embodiments will be set forth in part in the description that follows, and in part will be apparent from the description, or may be learned by practice of the disclosed embodiments.

The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes systems and methods for data transmission between network connected devices, and for reducing bandwidth used during the transmission of data, such as according to HTTP, between devices over the Internet. Specifically, when using a standard HTTP protocol to transmit data across a network, especially in a bandwidth controlled network, the need for generating and transmitting multiple, similar, fully-constructed, requests may be burdensome on the network and/or cause slow performance in an HTTP device. Accordingly, the presently disclosed systems and methods include techniques for transmitting HTTP requests including the data that is different from a previous request, instead of transmitting an entire, fully-constructed request including the data that is different from the previous request.

In its most fundamental form, if a first HTTP request includes the following request string: "send_me_datatype_123_of_element_i=A" and the first request is stored as "R1," a subsequent request for element "B," instead of element "A," may be constructed as "R1_i=B" instead of the longer and larger, fully-constructed request, "send_me_datatype_123_of_element_i=B". Systems and methods according to the presently disclosed techniques may be especially useful when a client is querying a Simple Object Access Protocol ("SOAP"), Extensible Markup Language ("XML"), or Representational State Transfer ("REST") service where the request has the same structure, and only small inputs are changed. By maintaining a copy of the initial request at the server, and returning to the client a unique identifier of such request, the client may be able to send back only the unique identifier and the needed difference to reconstruct a new request with much lesser payload.

Figure 1:
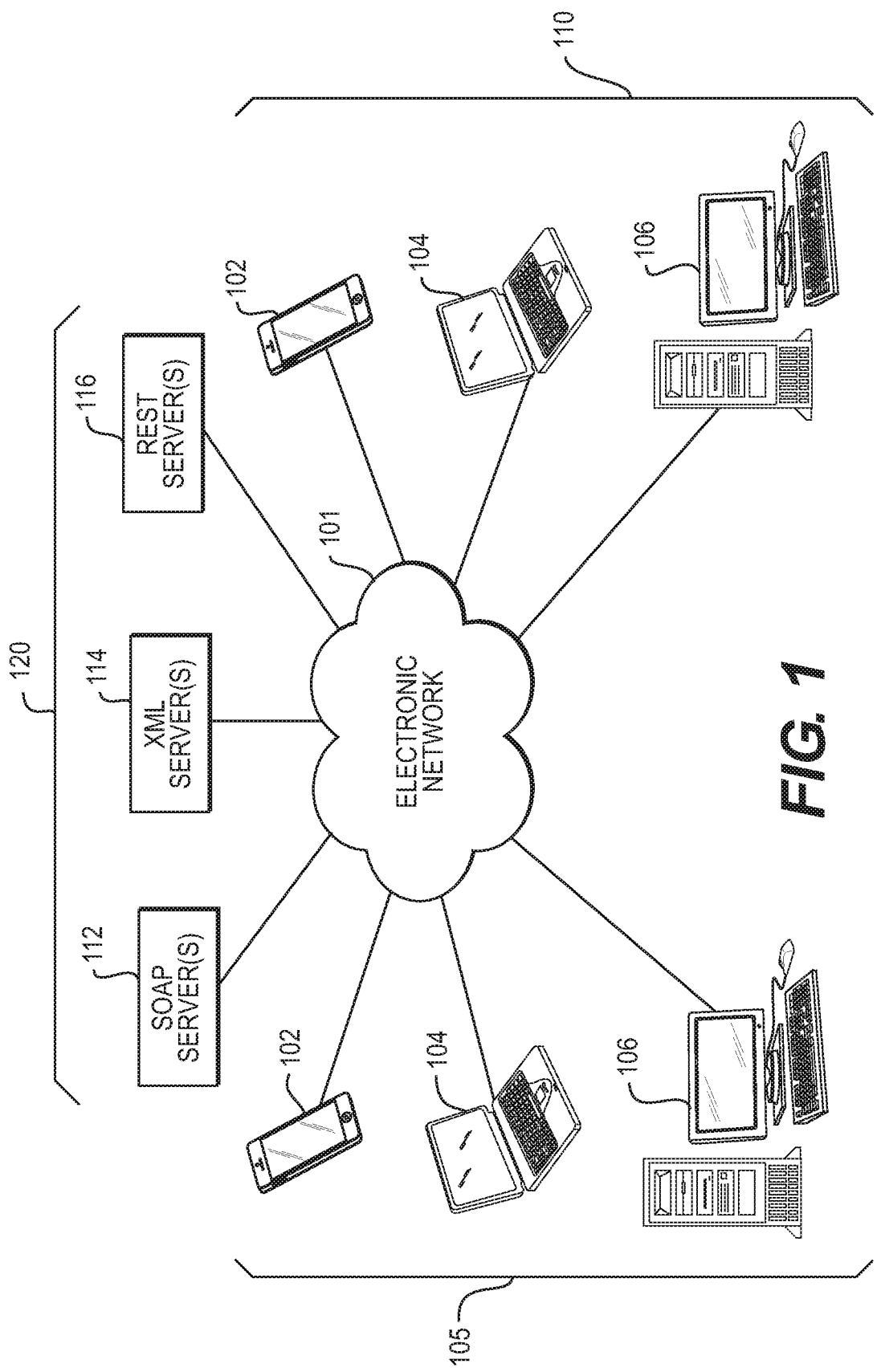
FIG. 1 is a schematic diagram of an environment in which devices may transmit data between each other over an electronic network, according to an exemplary embodiment of the present disclosure.

FIG. 1 is a schematic diagram of an environment in which bandwidth usage may be reduced during the transmission of HTTP requests and responses between devices over the Internet, according to an exemplary embodiment of the present disclosure. Specifically, FIG. 1 illustrates an exemplary environment including one or more first user devices 105, one or more second user devices 110, and/or one or more server systems 120. The present disclosure is applicable to data transfer between any combination of first user devices 105, second user devices 110, and server systems 120. For example, the present disclosure is applicable to data transfer: (i) between one of first devices 105 and one of second devices 120; (ii) between one of first devices 105 and one or more server systems 120; and (iii) between one of second devices 110 and one or more server systems 120.

As depicted in FIG. 1, first user devices 105 may include, for example, a mobile device or tablet 102, a laptop 104, and/or a computer or server 106. Likewise, the second user devices 110 may include, for example, a mobile device or tablet 102, a laptop 104, and/or computer or server 106.

In one embodiment, user devices 105, 110 may be owned and used by one or more people, who may be viewers of web pages and/or consumers of content over the Internet, either through an application, mobile browser, or web browser stored on respective user devices. User devices 105, 110 may include any type of electronic device configured to send and receive data, such as websites, multimedia content, and electronic advertisements, over electronic network 101. For example, each of user devices 105, 110 may include a mobile device, smartphone, and/or personal digital assistant ("PDA") disposed in communication with electronic network 101. In addition, each of user devices 105, 110 may be a tablet computer or any other kind of touchscreen-enabled device, personal computer, laptop, and/or server disposed in communication with electronic network 101. Each of user devices 105, 110 may have a web browser and/or mobile browser installed for receiving and displaying electronic content received from one or more web servers. Each of user devices 105, 110 may have an operating system configured to execute a web or mobile browser, and any type of application, such as a mobile application. In one embodiment, user devices 105, 110 may be configured to download applications and/or application content from application servers. In one embodiment, user devices 105, 110 may be configured to download one or more mobile applications from a mobile application server, and execute those one or more applications to receive and manipulate electronic content received from one or more of web servers and/or content distribution servers.

The one or more server systems 120 may include any type of web server, service, or any other type of web resource that may be accessed by one or more of the first or second devices 105, 110. In one embodiment, the server systems 120 may include, for purposes of illustration, one or more Simple Object Access Protocol ("SOAP") servers 112, one or more Extensible Markup Language ("XML") servers 114, and/or one or more ("Representational State Transfer") REST servers 116. In one embodiment, one or more of servers 120 may be associated with an entity that makes and distributes mobile applications, or Web-based services.

Any or all of the devices and/or servers 105, 110, 120 may be disposed in communication with an electronic network 101, such as the Internet. Moreover, any pair of the devices and/or servers 105, 110, 120 may be configured to exchange data packets over the electronic network 101 according to any suitable predetermined protocol, such as hypertext transfer protocol ("HTTP"). Any or all of the devices and/or servers 105, 110, 120 may be configured to perform various techniques for exchanging requests for data, responses to requests for data, and data, in manners to reduce the bandwidth used in such exchanges.

Figure 2:
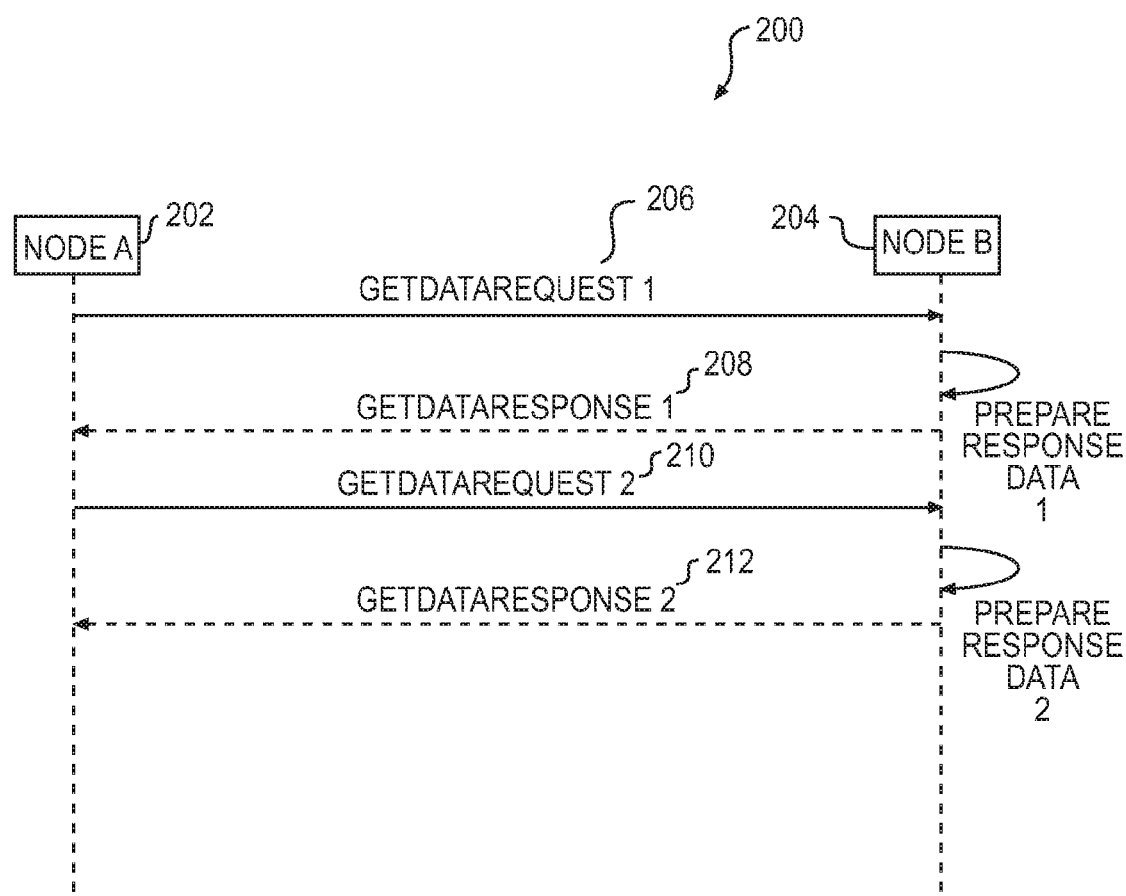
FIG. 2 is a flow diagram of a prior art method by which devices may transmit data between each other over an electronic network.

FIG. 2 depicts an exemplary prior art method by which devices and/or servers 105, 110, 120 would traditionally exchange requests for data, responses to requests for data, and data. Specifically, FIG. 2 depicts a prior art method 200 by which a first device 202 (i.e., "node A") would issue a first request for data ("getdatarequest1") 206 to a second device 204 (i.e., "node B"). The second device 204 would parse the request and prepare a complete first response to the first request for data. The second device would then send the complete first response 208 ("getdataresponse1") back to the first device 202 in response to the first request 206. If the first device 202 was instructed, either by a user or operating code, to issue a second, similar request, the first device 202 would generate a complete second request for data ("getdatarequest2") 210 to the second device 204. Again, the second device 204 would parse the request and prepare a complete second response to the second request for data. The second device would then send the complete second response 212 ("getdataresponse2") back to the first device 202 in response to the second request 206.

Thus, even when a pair of devices (e.g., nodes A and B, or any first and second devices) are exchanging very similar structured requests and responses that differ only in certain values or inputs, those devices send entire, fully constructed requests and responses, as described with respect to FIG. 2. Such methods involve significant bandwidth, or at the least, they do not efficiently conserve bandwidth. This inefficiency is especially burdensome, both in terms of time and revenue, in low bandwidth networks, such as mobile networks, or in bandwidth-limited or pay-per-data networks.

Accordingly, as described above, the presently disclosed systems and methods are directed to solving the above disclosed disadvantages, such as by executing the exemplary methods of FIGS. 3 and 4A-4C.

Figure 3:
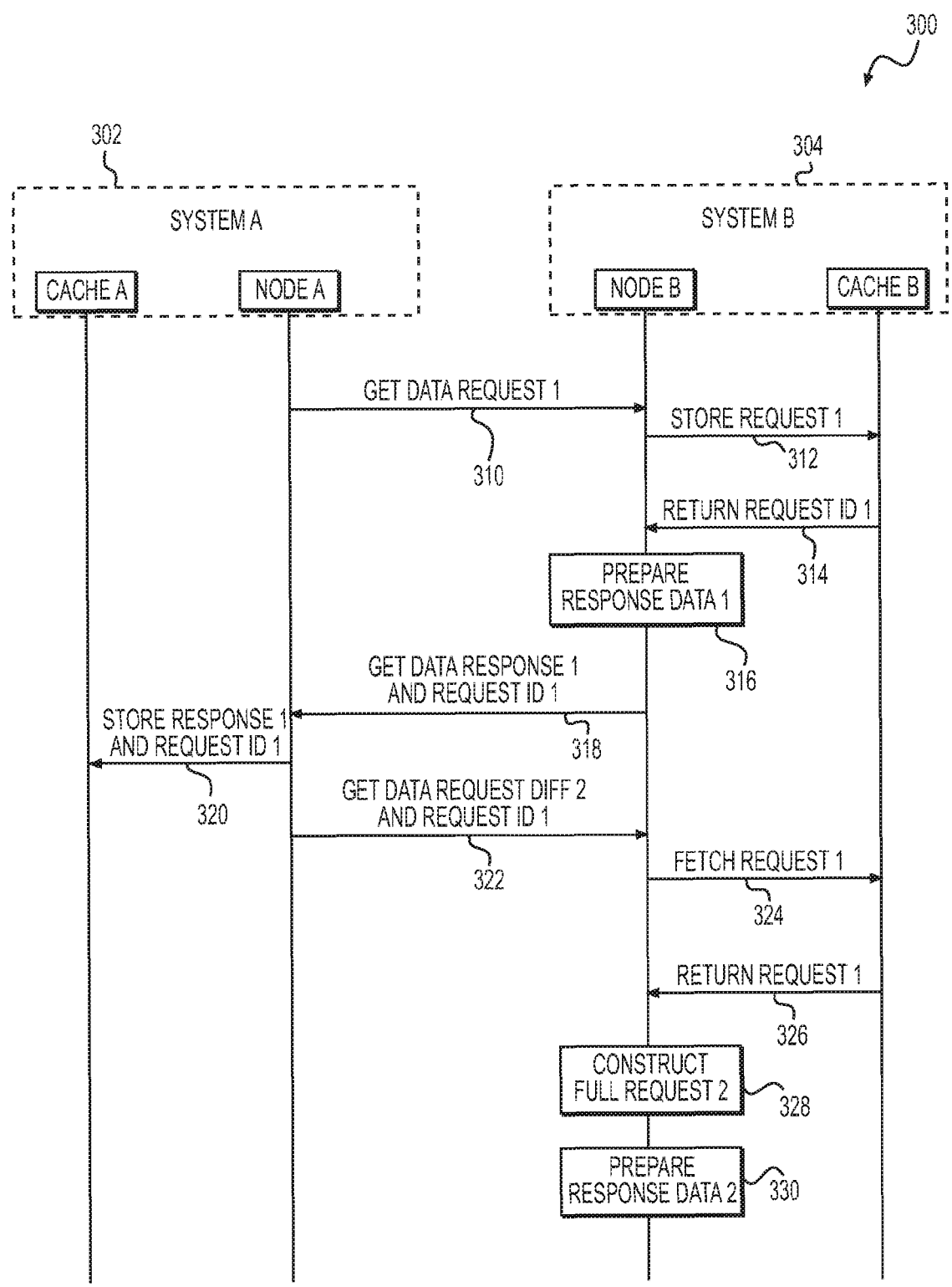
FIG. 3 is a flow diagram of an exemplary method by which devices may transmit data requests and data between each other over an electronic network, according to an exemplary embodiment of the present disclosure.

FIG. 3 depicts an exemplary method 300 for exchanging data, such as requests and responses for data, between a first device 302 and second device 304 (e.g., "system A" and "system B"). It should be appreciated that each of system A and system B may be one of devices 105, 110 or servers 120. In addition, while systems A and B are each described as having a cache (i.e., persistent data storage) and a node (i.e., combination of processor and RAM/ROM), each having different functions of sending and receiving data, the depicted arrangement is only exemplary. The functions of cache A and node A may be combined into a common device(s) or system(s), or cache A and node A may be remote from each other. Likewise, the functions of cache B and node B may be combined into a common device(s) or system(s), or cache B and node B may be remote from each other.

In one embodiment, method 300 may include the first system 302 (A) issuing a first data request (step 310) ("GetDataRequest1") to the second system 304 (B). First data request 310 may be any type of request that is structured according to some predetermined protocol, such as HTTP. Upon receiving the first data request 310, the second system 304 may store the request (step 312), such as by storing the request in cache B ("StoreRequest1"). In one embodiment, cache B may return a first request ID (step 314) to node B ("ReturnRequestID1"), or alternatively node B may generate the first request ID (step 314). The second system 304 may then prepare a response (step 316) ("PrepareResponseData1") to the first data request 310, and send the data response and the first request ID (step 318) back to the first system 302 ("GetDataResponse1+RequestID1").

Upon receiving the first data response (step 318), the first system 302 may store the request and request ID (step 320), such as by storing the request and request ID in cache A (step 320) ("StoreResponse1+RequestID1"). Accordingly, the first system 302 may have received a response to its first request, as well as an ID associated with the first request and/or the first response. As described above, at any given time in the future, the first system 302 may be instructed, either by a user or operating code, to issue a second request to the second system 304. In some cases, the second request may have a format or structure that is similar to or equivalent to the format or structure of the first request. For example, the first system 302 may be a client that is querying a SOAP/XML/REST service operating on the second system 304, where the second request has the same structure as the first request, and only small inputs or values are changed.

Accordingly, as shown in FIG. 3, at any time after receiving and storing the first response 318, 320, the first system 302 may prepare to send a second request to the second system 304 (step 322). Instead of preparing and sending a fully constructed second request, the first system 302 may prepare and send to the second system 304 a request differential between the first and second requests, along with the first request ID (step 322) ("GetDataRequestDiff2+RequestID1"). In other words, the first system 302 may send the second system 304 the ID for looking up the first request, and instructions or inputs for generating the second request based on one or more differences between the first and second requests. In some cases, the request differential with the first request ID may be considered a "partial second data request." Upon receiving the request differential between the first and second requests, along with the first request ID 322, the second system 304 may use the first request ID to fetch the first request (step 324), e.g., from cache B ("FetchRequest1"). The second system 304 may receive a returned first request (step 326) ("ReturnRequest1"), e.g., from cache B. The second system 304 may then construct a full second request (step 328) ("ConstructFullRequest2"). For example, the second system 304 may construct a full second request (step 328) based on both the first request (as identified by the first request ID) and second request differential received from the first system 302. In one embodiment, the second data request may be constructed by merging the received differential between the first data request and the second data request into the first data request. In one embodiment, the second data request may be constructed by swapping a payload element in the first data request with a payload element in the received differential between the first data request and the second data request. The second system 302 may then prepare response data (step 330) ("PrepareResponseData2").

The manner in which the second system 304 may prepare and transmit the response data (step 330) to the first system 302 may depend on a number of factors, such as any desire to track multiple requests and request IDs, and a desired extent of bandwidth conservation. Specifically, among other embodiments, the second system 304 may, in response to receiving the first request ID and the request differential between the first and second requests, send back to the first system 302 either (i) a response differential between the first and second responses; (ii) the response differential between the first and second responses, along with a second response ID; or (iii) a fully constructed second response, as will be described in more detail with respect to FIGS. 4A-4C.

Figure 4A:
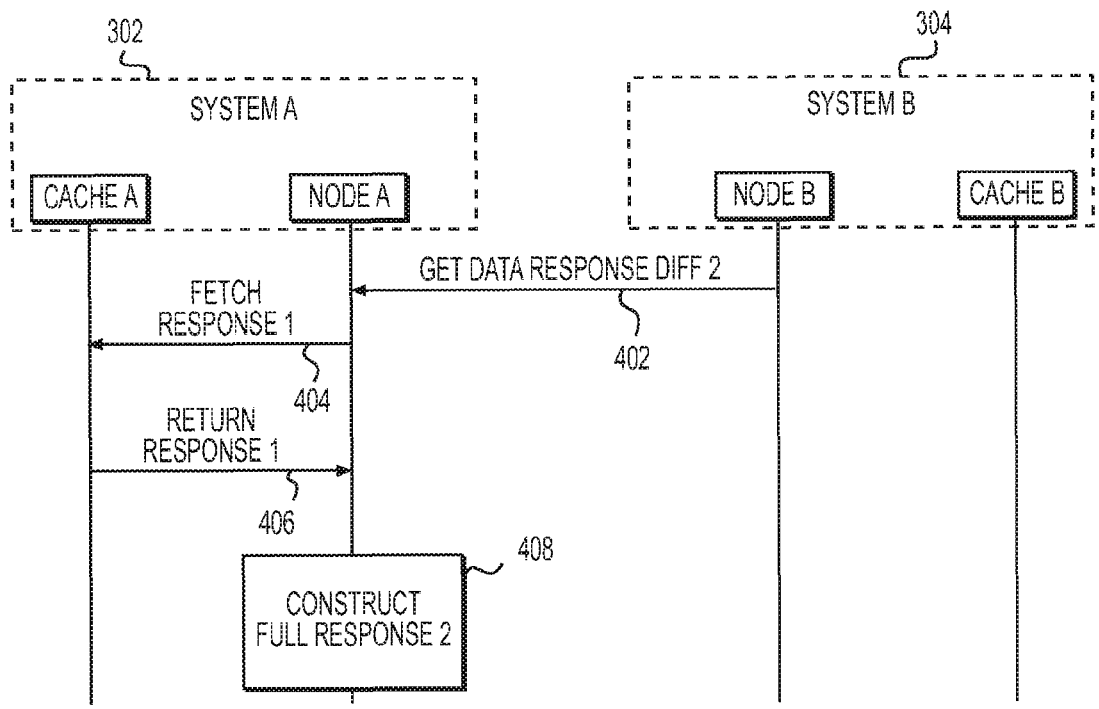
FIG. 4A is a flow diagram of a first exemplary method by which devices may transmit data responses to each other over an electronic network, according to an exemplary embodiment of the present disclosure.

FIG. 4A is a flow diagram of a first exemplary method by which devices may transmit data responses to each other over an electronic network, according to an exemplary embodiment of the present disclosure. Specifically, FIG. 4A depicts a method by which the second system 304 may, in response to receiving the first request ID and the request differential between the first and second requests, send back to the first system 302 a response differential (step 402) between the first and second responses ("GetDataResponseDifferential2"). The first system 302 may then fetch the first response (step 404) ("FetchResponse1"), such as from cache A, and return the first response (step 406) ("ReturnResponse1"), such as to node A. The first system 302 may then construct a full second response (step 408) ("ConstructFullResponse2"). Accordingly, the first system 302 may obtain a full second response even when the first system 302 only received from the second system 304 a response differential (i.e., the relatively smaller difference between the first and second responses). As a result, the first system 302 may obtain responses to its second and subsequent questions using significantly less bandwidth than if the second and subsequent responses were fully constructed by the second system 304 before transmission over a network.

Figure 4B:
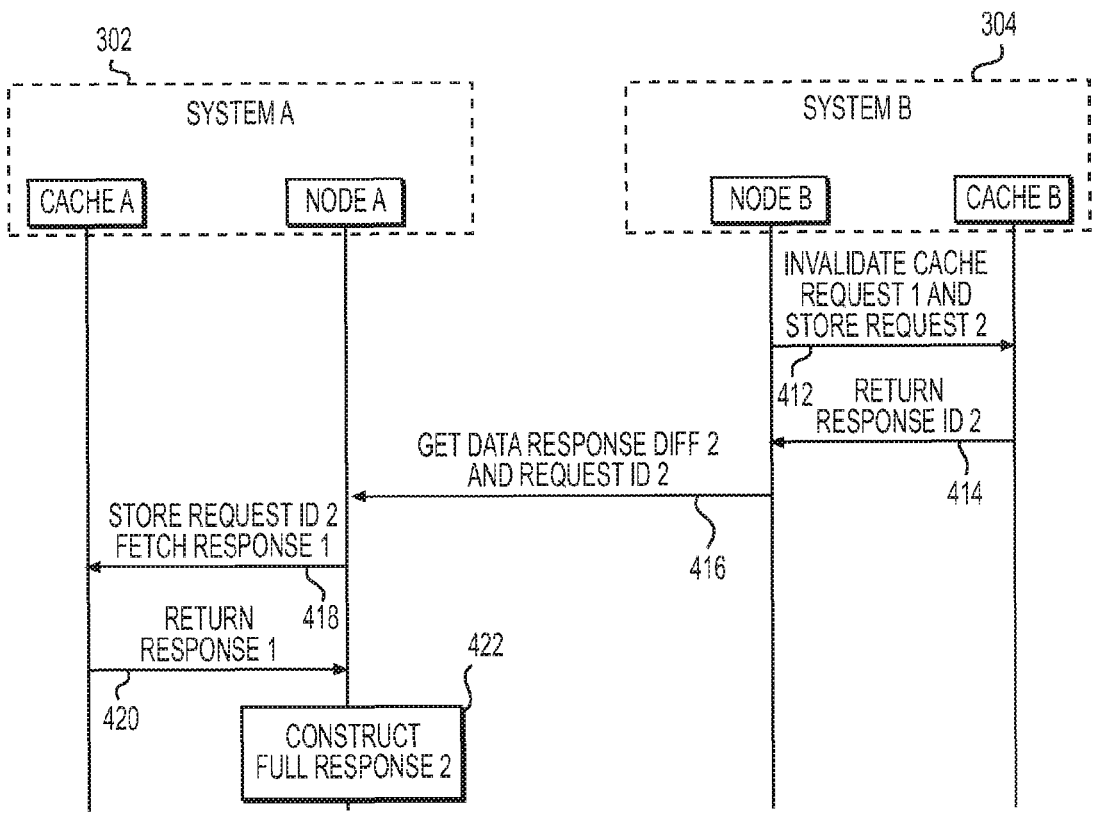
FIG. 4B is a flow diagram of a second exemplary method by which devices may transmit data responses to each other over an electronic network, according to an exemplary embodiment of the present disclosure.

FIG. 4B is a flow diagram of a second exemplary method by which devices may transmit data responses to each other over an electronic network, according to an exemplary embodiment of the present disclosure. Specifically, FIG. 4B depicts a method by which the second system 304 may, in response to receiving the first request ID and the request differential between the first and second requests, send back to the first system 302 the response differential between the first and second responses, along with a second response ID (step 416) ("GetDataResponseDifferential2+RequestID2"). In one embodiment, the second system 304 may have previously invalidated the first request, such as within cache B (step 412), and returned a second response ID (step 414) ("ReturnResponseID2"), such as to node B, for sending along with the second data response differential (step 416). Upon receiving the response differential between the first and second responses, along with a second response ID, the first system 302 may then store the second response ID and fetch the first response (step 418) ("StoreRequestID2+FetchResponse1"), such as from cache A, and return the first response (step 420) ("ReturnResponse1"), such as to node A. The first system 302 may then construct a full second response (step 422) ("ConstructFullResponse2"). Accordingly, the first system 302 may obtain a full second response even when the first system 302 only received from the second system 304 a response differential (i.e., the relatively smaller difference between the first and second responses)

and a second request ID (for use in future requests). As a result, the first system 302 may obtain responses to its second and subsequent requests using significantly less bandwidth than if the second and subsequent responses were fully constructed by the second system 304 before transmission over a network.

Figure 4C:
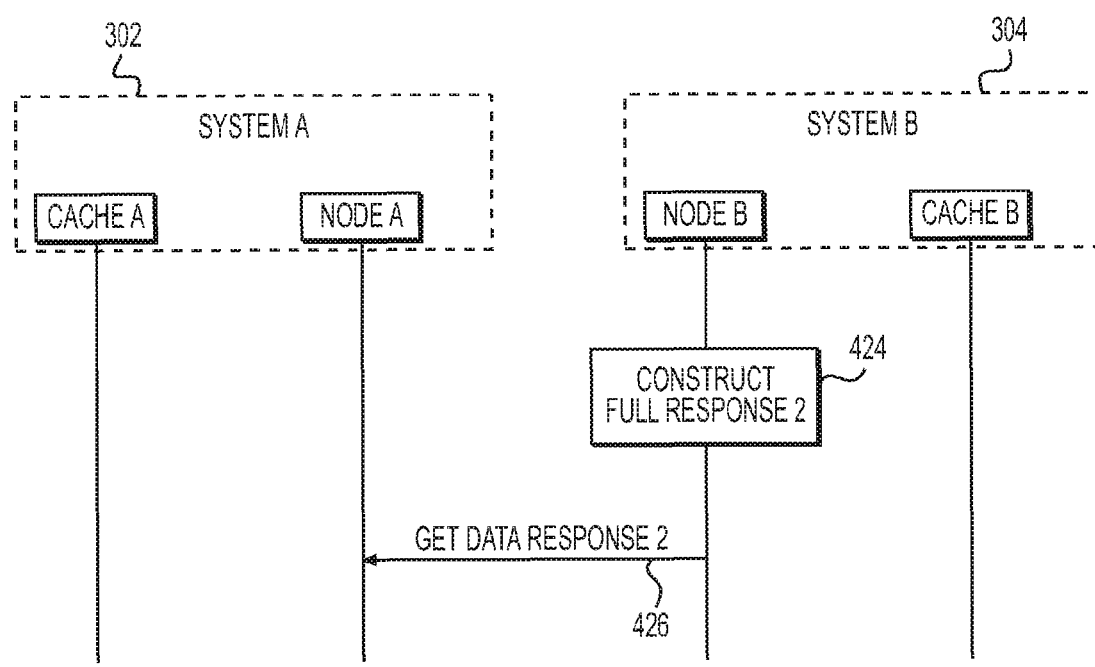
FIG. 4C is a flow diagram of a third exemplary method by which devices may transmit data responses to each other over an electronic network, according to an exemplary embodiment of the present disclosure.

FIG. 4C is a flow diagram of a third exemplary method by which devices may transmit data responses to each other over an electronic network, according to an exemplary embodiment of the present disclosure. In some cases, it may be desirable to send a fully constructed response from second system 304 to first system 302. For example, if cache B is unavailable or unresponsive, or if the first system is unable to retrieve a first response ID, then the second system 304 may be requested to construct a full second response (step 424), and second the fully constructed second response to the first system (step 426).

EXAMPLE

In one embodiment, the first data request 310 may be a request for a stock price, such as the following exemplary structure request:

```
POST /InStock HTTP/1.1
Host: www.example.org
Content-Type: application/soap+xml; charset=utf-8
Content-Length: nnn
X-Diff: 1
<?xml version="1.0"?>
<soap:Envelope
xmlns:soap="http://www.w3.org/2001/12/soap-envelope"
soap:encodingStyle="http://www.w3.org/2001/12/soap-encoding">
<soap:Body xmlns:m="http://www.example.org/stock">
<m:GetStockPrice>
<m:StockName>IBM</m:StockName>
</m:GetStockPrice>
</soap:Body>
</soap:Envelope>
```

In this example, the first device is requesting a stock price for the company, "IBM." The string, "X-Diff: 1" informs the recipient that the first device intends to invoke the bandwidth conserving techniques of the present disclosure. In one embodiment, the second system's storing of the first request (312), returning a request ID for the first request (314), preparing a response to the first request (316), and sending the response to the first system (318) may be executed according to the following exemplary code:

```
HTTP/1.1 200 OK
Content-Type: application/soap+xml; charset=utf-8
Content-Length: nnn
X-Diff: 1
X-Diff-Id: abc
<?xml version="1.0"?>
<soap:Envelope
xmlns:soap="http://www.w3.org/2001/12/soap-envelope"
soap:encodingStyle="http://www.w3.org/2001/12/soap-encoding">
<soap:Body xmlns:m="http://www.example.org/stock">
<m:GetStockPriceResponse>
<m:Price>34.5</m:Price>
</m:GetStockPriceResponse>
</soap:Body>
</soap:Envelope>
```

In this example, the second device confirms that it is executing the bandwidth conserving techniques of the present disclosure ("X-Diff: 1") and assigns the request an ID ("X-Diff-Id: abc"). The second device also includes in the full structure response the specific response to the first device's request, namely, in this example, the stock price for IBM ("<m:Price>34.5</m:Price>").

In one embodiment, any second or subsequent data request of a similar or equivalent structure may invoke the bandwidth conserving techniques of the present disclosure by generating and sending a request differential, as opposed to a fully constructed response. For example, the second data request 322 may be a request for the stock price of another company, such as GM, as illustrated by the following exemplary code:

```
POST /InStock HTTP/1.1
Host: www.example.org
Content-Type: application/soap+xml; charset=utf-8
Content-Length: nnn
X-Diff-Id: abc
X-Diff: 1
13x8 L3 V GM*
```

In this example, the string passes the agreed upon request ID: "X-Diff-Id: abc," and the term "13×8 L3 V GM*" may be defined where A×B is coordinate of the change; L is the length of the input to change, if specified; and V is the target value.

In one embodiment, the second data response 416 (FIG. 4B) may be sent consistent with the exemplary code:

```
HTTP/1.1 200 OK
Content-Type: application/soap+xml; charset=utf-8
Content-Length: nnn
X-Diff: 1
X-Diff-Id: efg
12x13 V 20.0*
```

In this example, the differential response invokes the bandwidth conserving techniques of the present disclosure ("X-Diff: 1"), and includes the assigned second request ID ("X-Diff-Id: efg") and the requested stock price of GM (in this case, "20.0").

In one embodiment, the second data response 426 (FIG. 4C) may include an entire structured response, consistent with the exemplary code:

```
HTTP/1.1 200 OK
Content-Type: application/soap+xml; charset=utf-8
Content-Length: nnn
X-Diff: 0
X-Diff-Id: efg
<?xml version="1.0"?>
<soap:Envelope
xmlns:soap="http://www.w3.org/2001/12/soap-envelope"
soap:encodingStyle="http://www.w3.org/2001/12/soap-encoding">
<soap:Body xmlns:m="http://www.example.org/stock">
<m:GetStockPriceResponse>
<m:Price>20.0</m:Price>
</m:GetStockPriceResponse>
</soap:Body>
</soap:Envelope>
```

In this example, the second device indicates that it is not invoking the bandwidth conserving techniques of the present disclosure ("X-Diff: 0"), includes the assigned second request ID ("X-Diff-Id: efg"), and the requested stock price of GM (in this case, "20.0"). However, the fully constructed second response contains more data than the differential responses generated according to FIGS. 4A and 4B.

Any of user devices 105, 110, and/or servers 120 may include any type or combination of computing systems, such as handheld devices, personal computers, servers, clustered computing machines, and/or cloud computing systems. In one embodiment, user devices 105, 110, and/or servers 120 may be an assembly of hardware, including a memory, a central processing unit ("CPU"), and/or optionally a user interface. The memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing software. The user interface may include any type or combination of input/output devices, such as a display monitor, touchpad, touchscreen, microphone, camera, keyboard, and/or mouse.

Figure 5:
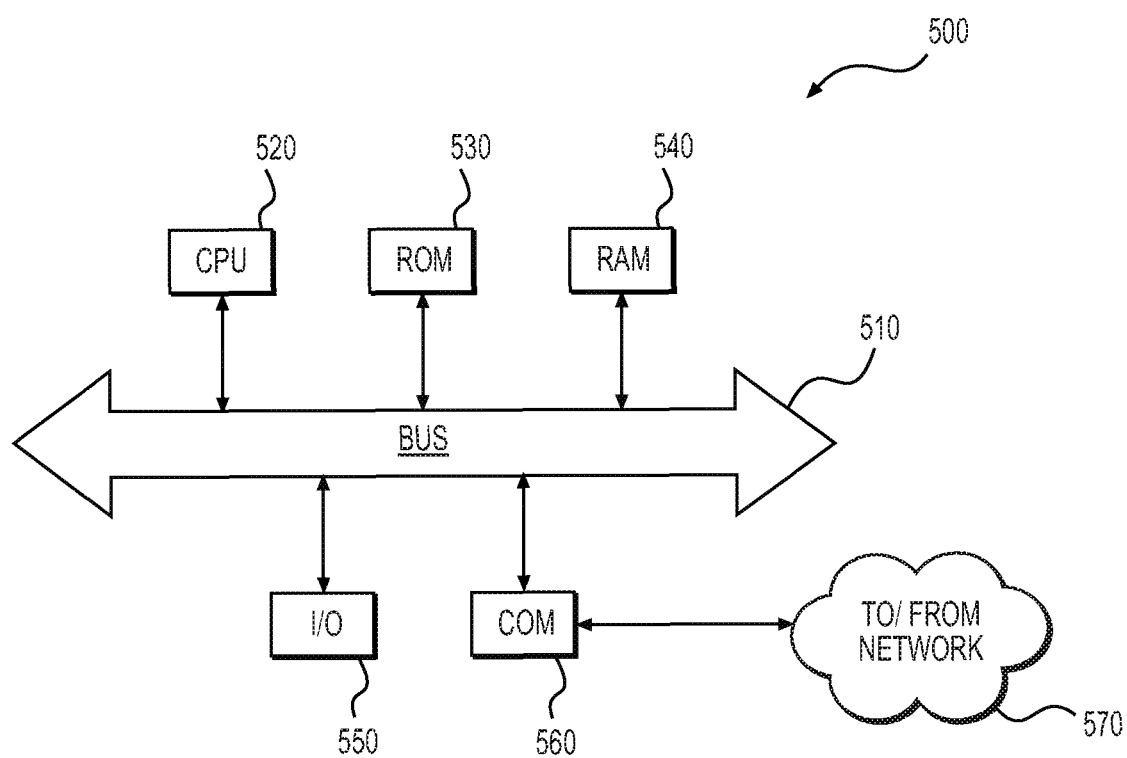
FIG. 5 is a simplified functional block diagram of a computer that may be configured as a device or server for executing the methods of FIGS. 2-4C, according to exemplary embodiments of the present disclosure.

FIG. 5 is a simplified functional block diagram of a computer that may be configured as a device or server for executing the methods of FIGS. 2-4C, according to exemplary embodiments of the present disclosure.

Specifically, in one embodiment, as shown in FIG. 5, any of devices 105, devices 110, and/or servers 120 may be an assembly of hardware 500 including, for example, a data communication interface 560 for packet data communication. The platform may also include a central processing unit (CPU) 520, in the form of one or more processors, for executing program instructions. The platform typically includes an internal communication bus 510, program storage, and data storage for various data files to be processed and/or communicated by the platform such as ROM 530 and RAM 540, although the system 500 often receives programming and data via network communications 570. The server 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed sharing application, methods, devices, and systems are described with exemplary reference to mobile applications and to transmitting HTTP data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol that is equivalent or successor to HTTP.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for reducing bandwidth during the transmission of data between first and second devices over a network, the method including:
   receiving, from the first device over the network, a first data request;
   receiving, from the first device over the network, a partial second data request, the partial second data request including a differential between the first data request and the second data request; and
   constructing, at the second device, a full second data request, based on a comparison between the first data request and the received differential between the first data request and the second data request by swapping a payload element in the first data request with a payload element in the received differential between the first data request and the second data request.

2. The method of claim 1, further comprising:
   generating, at the second device, a response to the full second data request; and
   transmitting, to the first device over the network, a differential between the response to the first data request and the response to the full second data request.

3. The method of claim 2, wherein the first device constructs a full second response, based on a comparison between the first data response and the received differential between the first data response and the full second data response.

4. The method of claim 1, further comprising:
   generating, at the second device, a response to the full second data request; and
   transmitting, to the first device over the network, a differential between the response to the first data request and the response to the full second data request.

5. The method of claim 4, wherein the first device constructs a full second response, based on a comparison between the first data response and the received differential between the first data response and the full second data response.

6. The method of claim 1, wherein the response to the first data request is stored at the first device.

7. The method of claim 1, wherein, constructing, at the second device, the full second data request, is performed by merging the received differential between the first data request and the second data request into the first data request.

8. The method of claim 1, wherein the first device is a personal computer, tablet computer, or smartphone and the second device is a server executing a Web-based Simple Object Access Protocol ("SOAP") service, Extensible Markup Language ("XML") service, or Representational State Transfer ("REST") service.

9. A system for reducing bandwidth during the transmission of data between first and second devices over a network, the system including:
- a data storage device storing instructions for reducing bandwidth during the transmission of data between first and second devices over a network;
- a processor configured to execute the instructions to perform a method including:
- receiving, from the first device over the network, a first data request;
- receiving, from the first device over the network, a partial second data request, the partial second data request including a differential between the first data request and the second data request; and
- constructing, at the second device, a full second data request, based on a comparison between the first data request and the received differential between the first data request and the second data request by swapping a payload element in the first data request with a payload element in the received differential between the first data request and the second data request.

10. The system of claim 9, wherein the processor is further configured for:
- generating, at the second device, a response to the full second data request; and
- transmitting, to the first device over the network, a differential between the response to the first data request and the response to the full second data request.

11. The system of claim 10, wherein the first device constructs a full second response, based on a comparison between the first data response and the received differential between the first data response and the full second data response.

12. The system of claim 9, wherein the processor is further configured for:
- generating, at the second device, a response to the full second data request; and
- transmitting, to the first device over the network, a differential between the response to the first data request and the response to the full second data request.

13. The system of claim 12, wherein the first device constructs a full second response, based on a comparison between the first data response and the received differential between the first data response and the full second data response.

14. The system of claim 9, wherein the response to the first data request is stored at the first device.

15. The system of claim 9, wherein, constructing, at the second device, the full second data request, is performed by merging the received differential between the first data request and the second data request into the first data request.

16. A non-transitory computer readable medium storing instructions that, when executed by a computer, cause the computer to perform a method of reducing bandwidth during the transmission of data between first and second devices over a network, the method including:
- receiving, from the first device over the network, a first data request;
- receiving, from the first device over the network, a partial second data request, the partial second data request including a differential between the first data request and the second data request; and
- constructing, at the second device, a full second data request, based on a comparison between the first data request and the received differential between the first data request and the second data request by swapping a payload element in the first data request with a payload element in the received differential between the first data request and the second data request.

* * * * *